April 21, 1964 G. STEIN 3,129,781
HYDROSTATIC DIFFERENTIAL TRANSMISSION
Filed Nov. 16, 1962 2 Sheets-Sheet 1
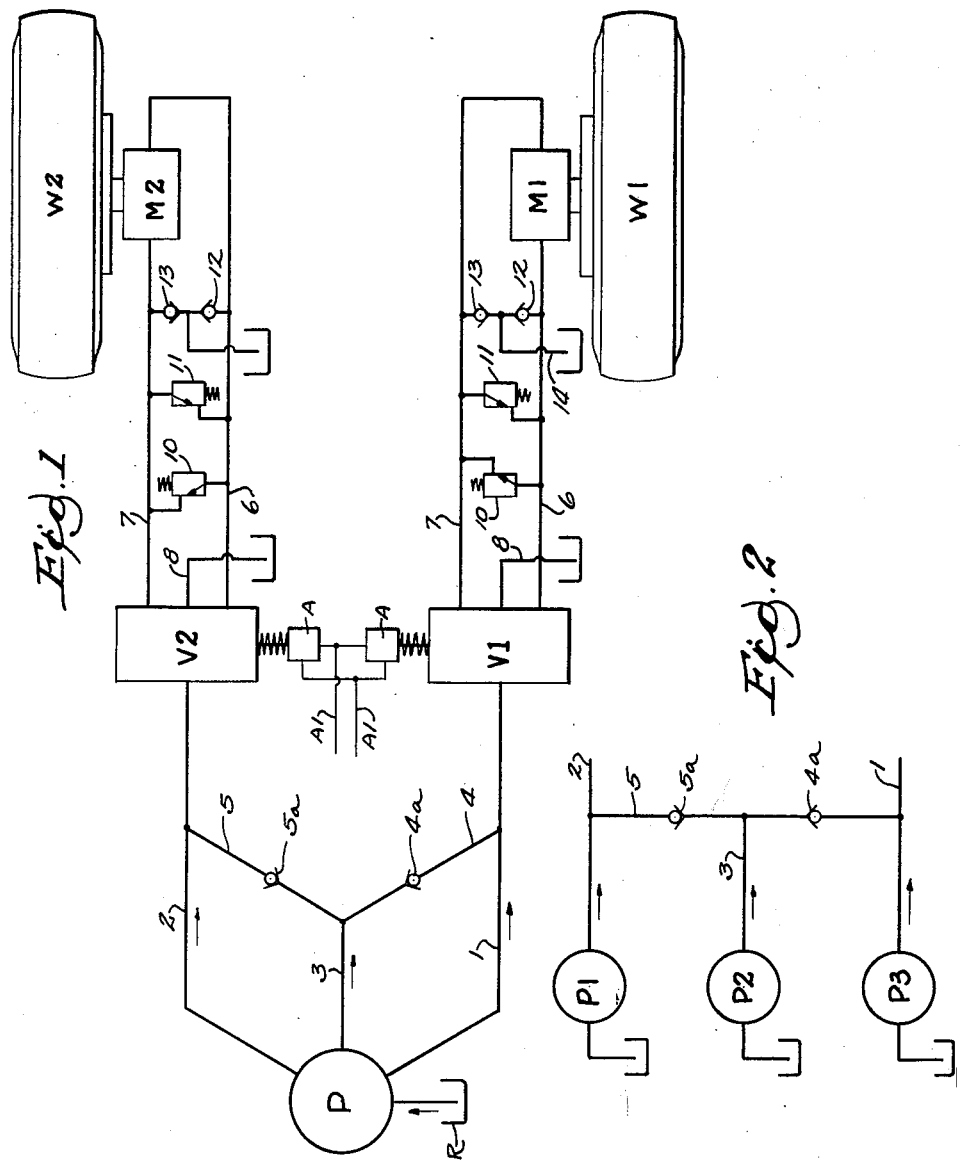
INVENTOR.
GARY STEIN
BY
Lieber, Lieber & Nilles
ATTORNEYS

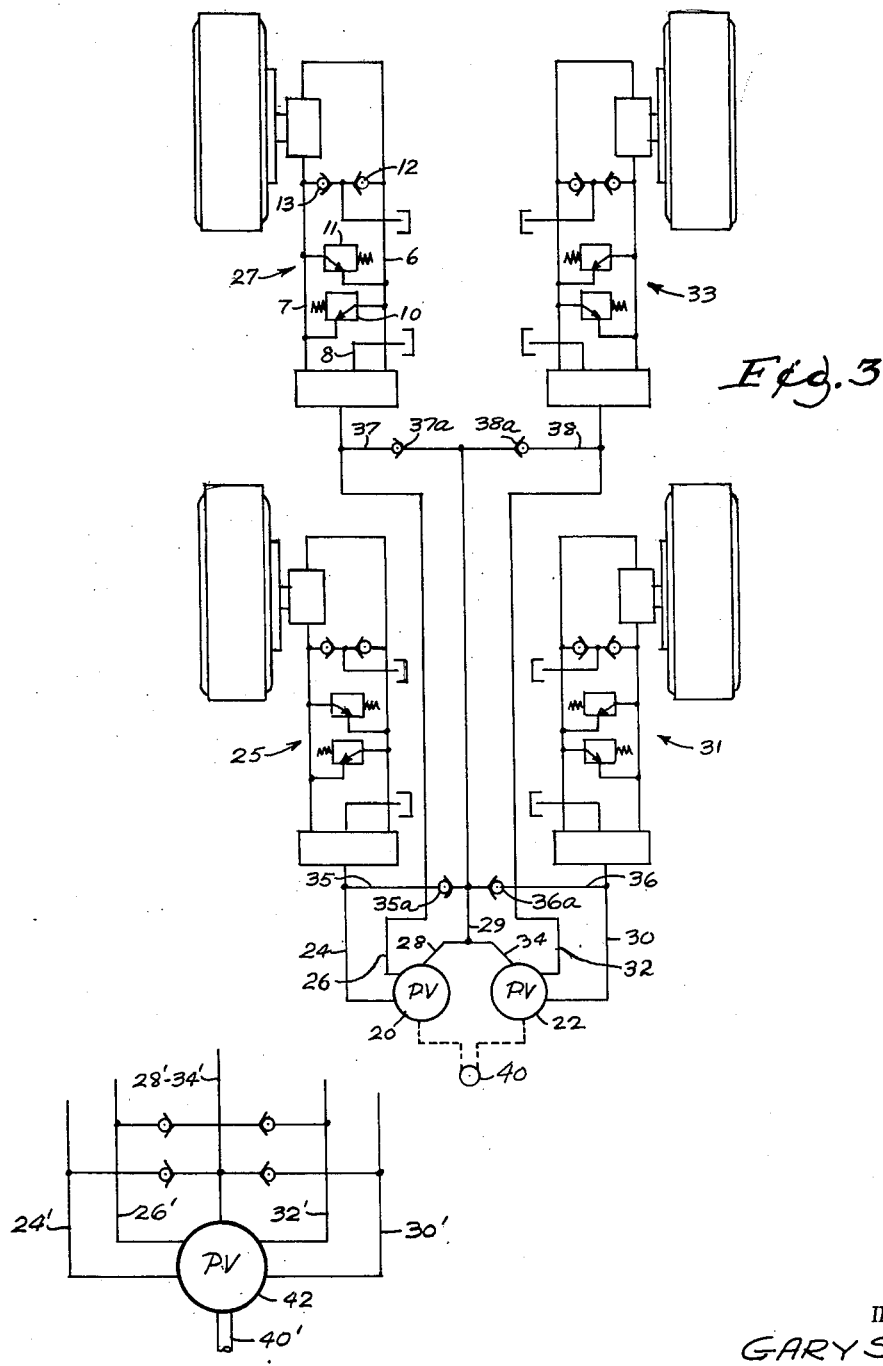

United States Patent Office 3,129,781
Patented Apr. 21, 1964

3,129,781
HYDROSTATIC DIFFERENTIAL TRANSMISSION
Gary Stein, New Berlin, Wis., assignor to Applied Power Industries Inc., Milwaukee, Wis., a corporation of Wisconsin
Filed Nov. 16, 1962, Ser. No. 238,837
8 Claims. (Cl. 180—44)

This invention relates to a hydrostatic differential transmission and more particularly to an improved system utilizing three independent sources of fluid for supplying power to two or more hydraulic motors drivingly connected to their respective traction wheels.

Certain prior art transmissions have utilized a hydraulic motor drivingly connected to each wheel of a pair of traction wheels and these motors were supplied with fluid from a pair of pumps. Problems have arisen in these drives, however, particularly in regard to unequal driving force between the wheels, as when making a turn. For example, when the conventional vehicle is turning, one traction wheel rotates faster than the other, and unequal driving force occurs as between the traction wheels.

Another serious problem in conventional hydrostatic differential transmissions has been that of wheel-spin due to loss of traction of one of the wheels which has heretofore resulted in loss of traction in the other driving wheel.

In an attempt to overcome the above-mentioned shortcomings, it has heretofore been proposed to utilize arrangements of equalizer lines, check valves, by-pass passages, and/or restrictions in the fluid lines, between the separate sources of fluid so as to permit differential travel of the wheels. These attempts have been unsatisfactory, however, for any one of several reasons; for example, (1) the spinning wheel would rob the system of pressure leaving the other wheel without power, (2) the speed of the loaded or remaining driving wheel would be almost doubled thereby contributing to difficulty of vehicle control, (3) or the restrictions used in the lines would result in considerable power loss.

Generally, therefore, the present invention provides an improved hydrostatic differential transmission which overcomes the above difficulties and which provdes differential driving action to the traction wheels whereby equal driving force will be furnished to the wheels as when making a turn. The transmission provided by the present invention also insures that when one wheel is unloaded completely, as when spinning on ice or in mud, power is not lost at the loaded wheel, but the speed of the remaining loaded wheel will drop, thus resulting in the operator being better able to control the vehicle.

A further objective of this invention is to provide a hydrostatic transmission of a four wheel drive type in which equalizing fluid is delivered to the wheel motors in a manner to insure standard outputs even though there may be unequal performance due to uneven wear in the system components.

A more specific object of the present invention is to provide a hydrostatic differential transmission of the above type which also utilizes replenishing valves that prevent cavitation and consequent damage to the fluid motors which would otherwise occur due to inertia loading effect of the wheels when the control valves are shifted to a neutral position.

These and other objects and advantages of the present invention will appear as this disclosure progresses, reference being had to the accompanying drawings, in which:

FIGURE 1 is a diagram of a hydraulic circuit utilizing the present invention; and FIGURE 2 is a schematic diagram of a modification of the circuit shown in FIGURE 1 and which utilizes three separate pumps for supplying fluid;

FIGURE 3 is a schematic diagram of a modification of the circuit utilizing a pair of variable output pumps in a four wheel drive embodiment; and FIGURE 4 is a schematic variation utilizing a single variable power pump divided five ways.

Referring more particularly to the drawings, FIGURE 1 shows one form of the invention wherein a single pump is utilized to furnish the three separate and independent sources of fluid for the transmission system. These sources of fluid furnish the power to their respective motors, one of which is secured in driving relationship to each traction wheel in the well-known manner. Although the vehicle itself is not shown or described, it will be understood that any number of ground supporting wheels may be utilized and at least a pair of traction wheels, indicated generally at W1, W2, are used to supply driving force to the vehicle.

The pump P, shown, may be of the type disclosed in the U.S. patent to Blair, No. 2,941,475, which issued on June 21, 1960. It is believed sufficient to say that this hydraulic pump may be of the type which splits its delivery into several independent supply conduits 1, 2, and 3, as shown. Other forms of fluid supply sources, some of which will be mentioned later, may be utilized, but it is important that three independent supply sources are used. Conduit 1 is in fluid delivering communication with the directional control valve V1 while conduit 2 furnishes fluid to the directional control valve V2. These control valves themselves are conventional and may be of the type shown in the U.S. patent to Hare, No. 2,951,505, which issued on September 6, 1960. For purposes of this disclosure, it is believed sufficient to say that these valves may be of the three-position, four-way type and are shown here as being operated by conventional air-actuated actuators A which, in turn, are operated through lines A1 in the conventional manner by a solenoid operated air valve (not shown). These control valves direct fluid selectively to either side of their respective motors via the lines 6 and 7. When these valves are in the neutral position, the fluid is directed via conduit 8 to the reservoir.

The hydraulic motors M1, M2, may thus be driven selectively in either direction depending on the position of their respective control valves, or when the valves are in the neutral position, the motors furnish no driving power to their associated wheels W1, W2.

The third supply conduit 3 extending from the pump P divides into two separate branches 4 and 5, which furnish supply fluid to their respective motors via their directional control valves. Check valves 4a and 5a respectively, are located in conduits 4 and 5, and thereby fluid from a third independent source is delivered separately and independently to the motors.

For purposes of illustration, assume that the pump is set to deliver 40% of its output to each of conduits 1 and 2, and the remaining 20% of the pump output is directed through conduit 3. When the output of the pump is divided in this manner, and the wheels are acting to furnish tractive power with equal force, each of the wheels will receive 50% of the fluid delivered by the pump and therefore each will act with equal driving force.

In making a turn, however, the wheel at the outside of the turn will naturally rotate faster, and if the pump was to continue to deliver an equal amount of fluid to each of the wheels, the faster rotating would have less driving effect or traction effort. With the present invention, however, the flow from conduit 3 is divided unequally when such a turn is being made and more fluid is automatically pumped into the more rapidly rotating wheel, thus resulting in equal driving force as between these traction wheels.

Another advantage of the present invention occurs when one of the wheels encounters ice or mud and thereby loses its traction effort. With the present system for delivering fluid from three separate and independent supply sources, all of the pressure in the system is not lost through the spinning wheel. In other words, all of the fluid does not go to the wheel which is experiencing traction loss but instead the wheel which remains loaded will at no time receive less than 40% of the fluid, using the above example. Instead, the loaded wheel will drop in speed because that portion of the fluid which was previously being split to it from the third source through conduit 3, will be lost through the slipping wheel. This reduction in speed of the loaded wheel is actually desirable because the operator can more easily control the vehicle due to this drop in speed of the non-slipping wheel.

By means of the present invention, it can therefore be seen that when a turn is being made, the system equalizes the traction effort as between the wheels. Furthermore, when wheel spin is encountered by one of the traction wheels, the wheel which remains loaded will continue to function, but at a reduced speed; at no time is power lost completely in the system nor does the loaded wheel double in speed as it does in certain prior art transmissions of this general type.

Referring now to the FIGURE 2 device, a different arrangement is shown for furnishing fluid from three independent sources of supply. In this modification, three separate pumps, P1, P2, and P3, are used, but the structure and function of the rest of the system may be as shown in FIGURE 1.

Relief valves 10 and 11 are inserted between lines 6 and 7, respectively, which act as overload reliefs in either direction of motor rotation. In other words, these valves furnish across-the-line relief protection for the motors, in either direction. They function, for example, when the directional control valves are shifted to neutral and the vehicle may still be moving. Under these circumstances, the motors are acting as pumps and are simply circulating fluid through themselves.

In a system as shown, as above-mentioned, when a control valve is shifted to neutral, its wheel may continue to spin and function as a pump in circulating fluid through itself and through its relief valve. These motors are subject to a certain amount of leakage and under this circumstance, cavitation of the motor, then acting as a pump, would occur with consequence, and well-known damage. To avoid this problem, replenishing valves have been provided for each motor, which valves permit fluid to be pumped from the reservoir as demanded by the motors. These replenishing check valves 12 and 13 are connected across lines 6 and 7 and via line 14 to the reservoir. When the inertia loading effect occurs, due to the spinning of the wheels with the control valve in neutral, either overload valve, 10 or 11, will open, depending on the direction of wheel rotation, to permit the fluid to simply pass through the motor. As the fluid is thus recirculated through the motor, the fluid lost from the motors due to leakage is made up via the replenishing valves 12 and 13. Stated otherwise, when the motor is thus rotating it acts as a pump to draw fluid through either of the check valves 13 or 12 from the reservoir, thus avoiding cavitation.

The replenishing valves 12 and 13 would not be required where these inertia loading effects are not present.

With the present arrangement, restrictions in the lines are unnecessary to provide differential action, and the conduits may be sized for maximum efficiency and minimum power loss, and instead, the fluid mechanics of the valving is utilized to provide the differential action.

It is often times desirable, especially in very large hydraulically driven vehicles, to deliver power to each of four wheels. A reference to FIGURE 3 discloses a four wheel drive environment in which the previously described advantages are preserved along with further useful and novel functions.

In the FIGURE 3 circuitry, there is shown a pair of variable delivery pumps 20 and 22 each having a divided flow characteristic. Pump 20 has an output 24 leading to wheel assembly 25, and output 26 leading to wheel assembly 27, and an auxiliary output 28. Pump 22 has an output 30 leading to wheel assembly 31, an output 32 leading to wheel assembly 33, and an auxiliary output 34.

Outputs 28 and 34 are communicated at conduit 29. Conduit 29 first divides into branches 35 and 36 and then into branches 37 and 38. One-way check valves 35a and 36a, respectively, are located in conduits 35 and 36, and one-way check valves 37a and 38a are located, respectively, in conduits 37 and 38. The pumps 20 and 22 are connected by a mechanical connection 40 for simultaneously varying their outputs.

Therefore, assuming that pumps 20 and 22 are set to deliver approximately 20% of their respective outputs to conduits 28 and 34, it can be seen that this 20% is available to any of the wheel assemblies 25, 27, 31, and 33. In addition to providing the desirable differential effect in vehicle turning or when there is a loss of traction in one or more of the ground engaging wheels as previously described, the pressures in conduit 29 are sufficient to balance fluid outputs in the wheel assemblies even though there may be unequal requirements in each.

Referring to FIGURE 4 there is shown a variable output pump 42 having independent outputs 24', 26', 28'—34', 32' and 30'. Such an arrangement will work precisely like the arrangement shown in FIGURE 3, but with the added advantage of having only one central power source.

Various modes of carrying out the invention are contemplated as being within the scope of the following claims particularly pointing out and distinctly claiming the subject matter which is regarded as the invention.

This application is a continuation-in-part of my copending application Serial No. 86,706, filed February 2, 1961, now abandoned.

I claim:

1. In a driving arrangement for a vehicle having a pair of traction wheels, a hydrostatic differential transmission including, a fluid motor drivingly connected to each of said traction wheels; two independent fluid supply sources, one for each of said motors for furnishing driving fluid thereto; a third independent fluid supply source for furnishing fluid to each of said motors; and a one-way check valve between said third source and each of said motors whereby said third source delivers fluid independently and separately to each of said motors.

2. In a driving arrangement for a vehicle having a pair of traction wheels, a hydrostatic differential transmission including, a reversible fluid motor drivingly connected to each of said traction wheels; two independent fluid supply sources, one for each traction wheel; a pair of control valves, one for each of said traction wheels and each in fluid receiving communication with its respective supply source, said valves also each having a pair of conduits communicating with its respective fluid motor for furnishing driving fluid thereto for rotation thereof in either direction; a third fluid supply source for furnishing fluid to each of said control valves; and a one-way check valve between said third source and each of said control valves whereby said third source delivers fluid independently and separately to each of said control valves.

3. An arrangement as defined in claim 2 including replenishing check valves in fluid delivering communication with each of said motors and adapted to supply fluid thereto when said control valves are not supplying fluid to their respective motor and the latter is rotating.

4. In a vehicle of the type having traction elements at opposite sides thereof, hydraulic motors independently connected to each of said elements, a separate source of fluid for each of said motors, and hydraulic circuitry connecting the sources to the motors, the improvement residing in a third independent and separate source of fluid for furnishing fluid separately and independently to each of said hydraulic motors, and one-way check valve means between said third source of fluid and each of said hydraulic motors.

5. In a vehicle of the type having a pair of traction wheels at opposite sides thereof, and a hydraulic motor connected to each of said wheels for driving thereof in either direction, and independently connected to each motor to a separate source of fluid for each of said wheels, hydraulic circuitry between each of the sources and each of said motors, and directional control valve, the improvement residing in a third independent and separate source of fluid for furnishing fluid separately and independently to each directional control valve, and one-way check valve means between said third source of fluid and each of said control valves.

6. In a system for delivering fluid to a plurality of fluid motors comprising a hydrostatic differential transmission including, a fluid supply source for each of said motors, an independent fluid supply source, and a one-way check valve between said independent source and each of said motors whereby said third source delivers fluid independently and separately to each of said motors.

7. The system defined in claim 6 wherein there are four fluid motors.

8. In a system for delivering fluid to four independent fluid motors comprising a hydrostatic differential transmission including first and second variable delivery pumps, first and second outputs from said first pump and third and fourth outputs from said second pump, conduits communicating each of said motors with one of said outputs, a fifth output from said first pump and a sixth output from said second pump, means communicating said fifth and sixth outputs, second means communicating said fifth and sixth outputs with said first, second, third, and fourth outputs, and four one-way check valves in said second means between said fifth and sixth outputs and said first, second, third, and fourth outputs.

References Cited in the file of this patent

UNITED STATES PATENTS

| | | |
|---|---|---|
| 2,257,108 | Cornwell | Sept. 30, 1941 |
| 2,446,242 | Orshansy | Aug. 3, 1948 |
| 2,599,450 | Henning | June 3, 1952 |
| 2,626,001 | Antle | Jan. 20, 1953 |
| 2,869,662 | Koup | Jan. 20, 1959 |
| 2,876,623 | Slomer | Mar. 10, 1959 |
| 3,075,598 | Pheneger | Jan. 29, 1963 |